Nov. 26, 1968 R. L. GOWER 3,412,775
PLATFORM-TYPE TRACTION STRUCTURE ASSEMBLY
Filed Sept. 13, 1966 2 Sheets-Sheet 2
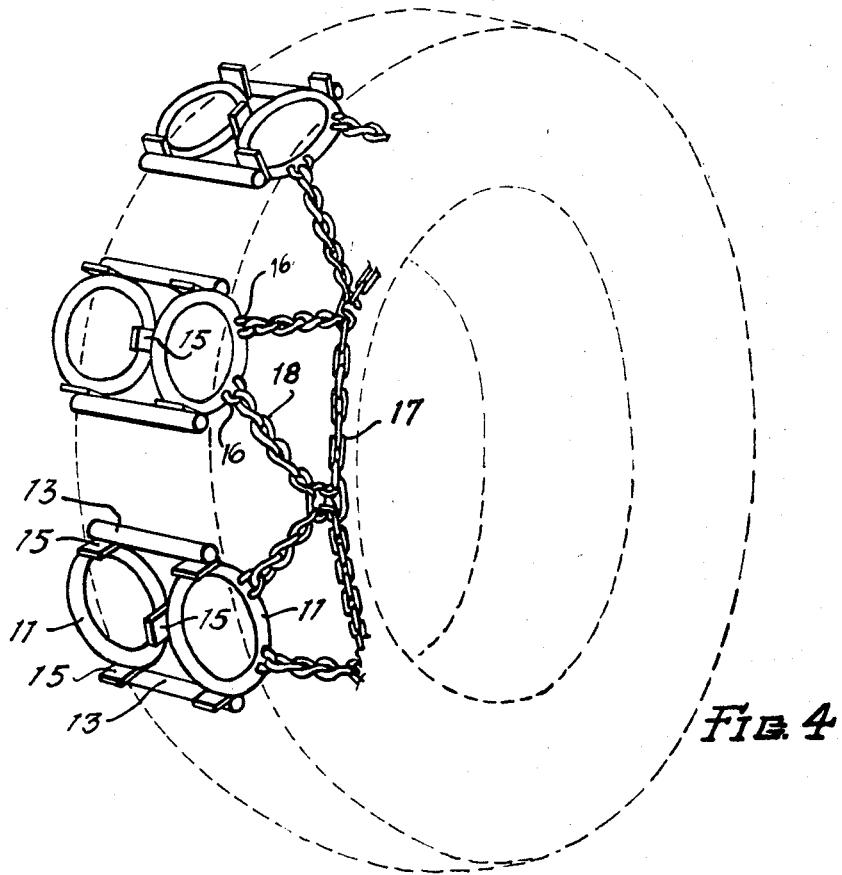
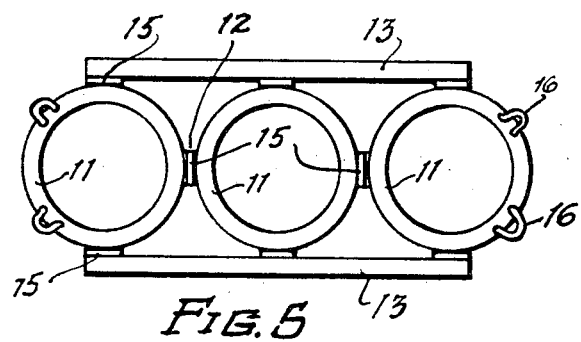
INVENTOR.
ROGER L. GOWER
BY
ATTORNEY.

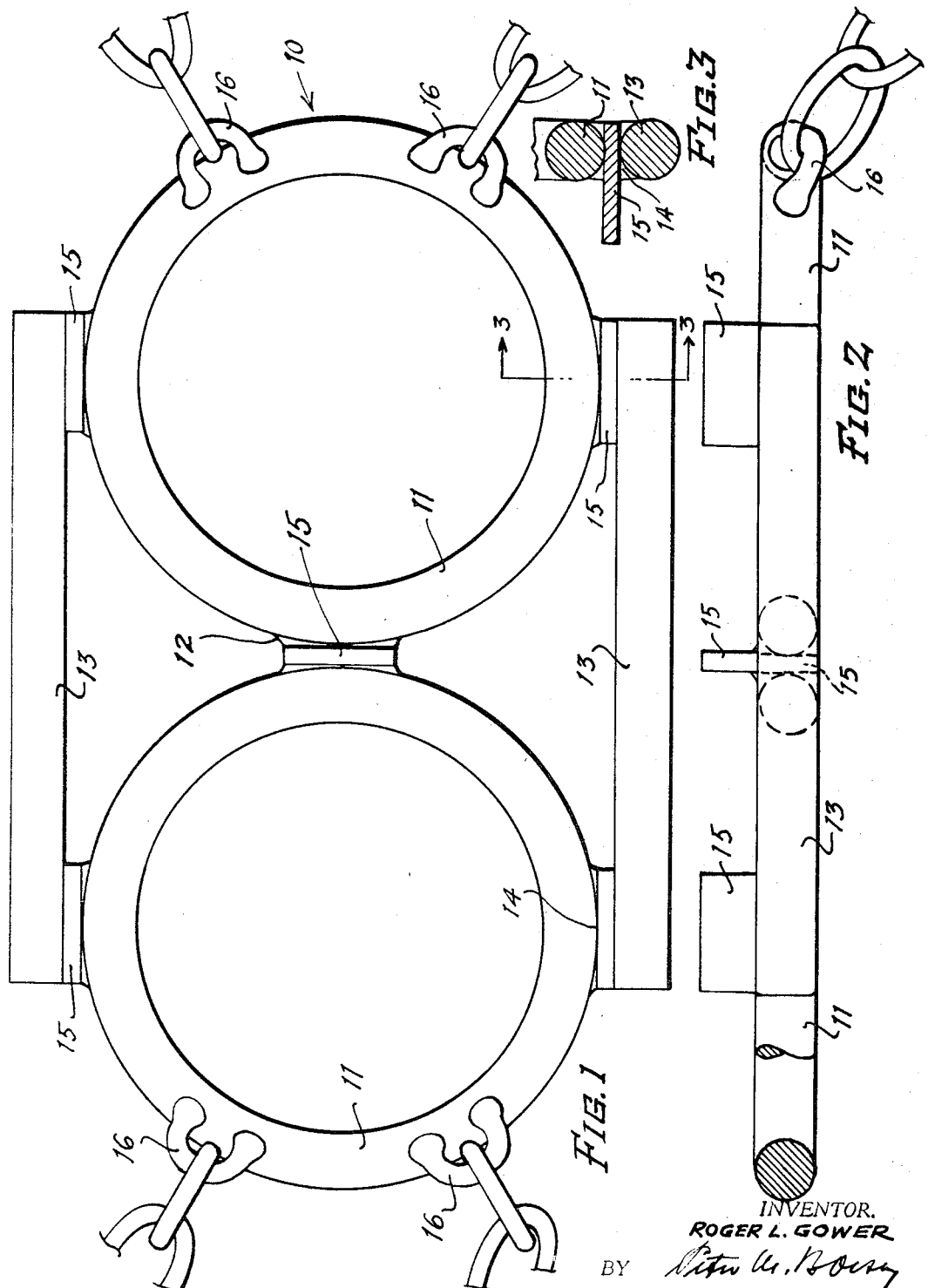

United States Patent Office 3,412,775
Patented Nov. 26, 1968

3,412,775
PLATFORM-TYPE TRACTION STRUCTURE
ASSEMBLY
Roger L. Gower, P.O. Box 65, Canaan, Maine 04924
Filed Sept. 13, 1966, Ser. No. 579,071
7 Claims. (Cl. 152—229)

ABSTRACT OF THE DISCLOSURE

This invention relates to traction devices for motor-driven vehicles used in moving heavy loads over difficult terrain, and consists of a series of elements comprising multiple rings, tangentially connected to each other and to parallel bars, and having at said points of connection projecting lugs; said elements being so arranged that the parallel bars are disposed transversely with respect to the plane of the wheel when said traction assembly is mounted thereon.

---

This invention relates to traction devices for motor-driven vehicles, and particularly for such vehicles as are used in moving heavy loads through snow, mud, sand or other difficult terrain.

Anti-skid devices such as have heretofore been manufactured have been provided in some cases with a longitudinal series of rings upon which there were welded or otherwise attached, at spaced intervals, multiple lugs, cleats, points, or other gripping members. However, those protrusions, which necessarily followed the contour of the rings in their mounting thereon, were placed in a modified diagonal direction when the assembly was mounted on a wheel, and this increased the skidding when the ring tipped, upon the application of unequal force.

The present invention comprises a series of rings transversely disposed in a platform-type structure with laterally attached, parallel bars, and protruding elements at the juncture points of the rings and the bars, with the protruding elements between said rings being so disposed that they will be in the plane of the wheel, and the protruding elements between the rings and the bars being disposed in transverse relationship to the plane of the wheel. Thus the danger of a sidewise or diagonal skidding action is eliminated, and the forward drive of the multiple protruding elements between the rings and the bars is increased substantially over any traction device heretofore known. When gripping force is exerted by any of the protruding elements of the platform structure, the strength of the entire structure is joined with that gripping force.

The cross-bars of the present invention hold the rings in rigid relationship to each other and to the bars, so that there is no independent suspension of any one ring. Furthermore, the straight-line construction of the platform lessens the tendency for the structure to clog with mud or packed snow, because the unequal pressure of a pneumatic tire upon the entire width of the platform prevents the accumulation of such mud or snow.

It is the purpose of this invention to provide a gripping means assembly, having the nature of a series of platforms, for attachment, by means of non-rigid connections, to each other upon the wheels of a vehicle in such a manner that protruding elements upon the side of each platform which is outermost from the wheel will penetrate into the mud, snow or other soft terrain as the wheel turns to move the vehicle, such thrust of the protruding elements serving to increase the traction of the wheel. When full contact with the ground has been made by the protruding elements on one of such platforms, the lugs on the leading edge of the next of said platforms in an assembly will be approaching contact with the ground, so that there is a continuing traction provided by the protruding elements on the successive platforms in the assembly.

Products which have heretofore been used in an effort to increase traction have been only partially effective because they were either completely or partially flexible, and because their gripping members, as has been explained above, did not provide as much effective traction as was needed.

In the present invention, the platform is of rigid construction and the protruding elements thereon are so disposed as to coact with the pressure upon the tire and thus force all of the protruding elements on the said platform to act in unison, and to hold tightly in providing traction through soft or powdery terrain or upon slippery surfaces.

Turning to the drawings:

FIGURE 1 is a top plan view of a platform-type traction structure;

FIGURE 2 is a side elevation of the same;

FIGURE 3 is a section taken on line 3—3 of FIGURE 1;

FIGURE 4 is a perspective view showing a series of such platform-type structures assembled together and mounted on a wheel; and FIGURE 5 is a top plan view of a modification of the invention, in which three rings are disposed or arranged between the parallel bars.

Referring more specifically to the drawings, FIGURE 1 shows a platform-type traction structure 10 comprising a pair of rings 11, 11, joined together at 12 and having a pair of bars 13, 13 tangentially attached, in parallel relationship, to the opposing perimeters of the said rings, at points 14 thereon, each point 14 being spaced 90 degrees from the juncture point 12 between said rings. At juncture point 12 and at each of the four juncture points 14, there are provided protruding elements 15 of such character and contour as to penetrate into a soft or powdery surface or other difficult terrain. Loops 16 have connecting chains for attaching the platform to the side chain.

FIGURE 2, being a side elevation of the invention, shows the protruding elements 15 extending above the plane of the structure, with the base of the element 15 at juncture 12, and the cross-sections of the rings, shown in dotted lines at the center of the figure. In manufacture, the element 15 may be either sufficiently long to have its base interposed between the rings, as is shown in the drawing, or each of the elements 15 may be shortened and imbedded in the weldment which connects the said rings and the rings and bars.

Although the drawing shows element 15 at juncture 12 having the same height above the plane of the platform as elements 15 at junctures 14, it has been found in use of this invention that better traction is secured by having element 15 at juncture 12 longer than the other elements 15, so as to protrude further than the said other elements 15. Greater grip is provided by this longer element at the center of the platform, that is, at the point of greatest concentration of pressure upon the traction platform.

FIGURE 3 shows the same members in cross-section, with the protruding element 15 interposed at point 14 between the ring 11 and the bar 13. As has been explained above, manufacturing procedures may be used wherein the element 15 is either interposed between said ring and bar members, or it may be shortened and imbedded in the weldment which connects the said members.

FIGURE 4 shows a series of platform-type assemblies 10, independently connected to side chains 17 with connecting chains 18, in such a manner as to reduce to a minimum the possibility of movement of the platforms in relation to the tire upon which they are mounted.

FIGURE 5 shows a modification of the invention as heretofore disclosed, comprising a series of more than two rings, and the members may be easily identified by reference to their counterparts in FIGURE 1.

While the foregoing sets forth the preferred embodiments and means of operation according to my invention, it is understood that many modifications and variations will be immediately understood by those making use of my invention.

I claim:

1. A traction assembly unit comprising a series of rigid, platform-type structures, circumferentially and detachably mounted upon the tread portion of a tire, having each of said platform-type structures comprising multiple rings, tangentially joined together a juncture points and having bars in parallel relationship tangentially connected to the opposing sides of said rings.

2. An invention as claimed in claim 1, wherein protruding elements are provided, at the juncture points of said rings and of said rings and said bars, whereby to increase the traction capacity of said structures.

3. A unit of a traction assembly comprising a pair of parallel bars and multiple rings lying in the plane of the latter and between said bars, said rings being tangentially connected to each other and to the said bars, and an element attached at each of said points of connection and protruding in a direction perpendicular to the plane of said ring and bar structure.

4. An invention as claimed in claim 3, wherein said protruding elements at the juncture points of said bars and said rings are disposed parallel to the said bars, and wherein said protruding elements at the juncture points of adjacent rings are disposed perpendicular to said other protruding elements.

5. An invention as claimed in claim 4, wherein the protruding element at the juncture point of adjacent rings extends outwardly from the plane of the said unit a greater distance than the protruding elements at the juncture points of said rings and said bars.

6. An invention as claimed in claim 3, wherein said units are attached, independently of each other, to connecting means whereby the assembly may be detachably mounted upon the wheel of a vehicle.

7. An invention comprising multiple rings tangentially connected together and having bars in parallel relationship tangentially connected to the opposing sides of said rings, said connections being effected by weldments at the points of juncture, and a protruding element imbedded in each of said weldments, said protruding element extending in a plane perpendicular to the plane of said structure of rings and bars.

References Cited

UNITED STATES PATENTS

| 1,670,528 | 5/1928 | Carpenter | 152—243 |
| 1,818,794 | 9/1931 | Drager | 152—229 |
| 2,545,887 | 3/1951 | Langenfeld | 152—243 |
| 3,313,335 | 4/1967 | Gower | 152—229 |

ARTHUR L. LA POINT, *Primary Examiner.*

C. B. LYON, *Assistant Examiner.*